United States Patent
Jain et al.

(10) Patent No.: US 10,444,365 B1
(45) Date of Patent: Oct. 15, 2019

(54) OBJECT DETECTION BASED ON LIDAR INTENSITY

(71) Applicant: Uber Technologies, Inc., San Francisco, CA (US)

(72) Inventors: Shantanu Jain, Pittsburgh, PA (US); Gehua Yang, Wexford, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/166,950

(22) Filed: Oct. 22, 2018

Related U.S. Application Data

(60) Provisional application No. 62/712,479, filed on Jul. 31, 2018.

(51) Int. Cl.
| | | |
|---|---|---|
| G01S 17/93 | (2006.01) | |
| G01S 7/48 | (2006.01) | |
| G01S 17/06 | (2006.01) | |
| G01S 17/89 | (2006.01) | |

(52) U.S. Cl.
CPC .......... G01S 17/936 (2013.01); G01S 7/4808 (2013.01); G01S 17/06 (2013.01); G01S 17/89 (2013.01)

(58) Field of Classification Search
CPC . G08G 1/165; B60Q 9/008; B60R 2300/8093
See application file for complete search history.

(56) References Cited

U.S. PATENT DOCUMENTS

| | | | |
|---|---|---|---|
| 2007/0219720 A1* | 9/2007 | Trepagnier | B60W 30/00 701/300 |
| 2011/0040482 A1* | 2/2011 | Brimble | G01S 7/4814 701/301 |
| 2011/0285982 A1* | 11/2011 | Breed | B60N 2/002 356/4.01 |

* cited by examiner

*Primary Examiner* — Fabricio R Murillo Garcia
(74) *Attorney, Agent, or Firm* — Schwegman Lundberg & Woessner, P.A.

(57) ABSTRACT

Aspects of the present disclosure involve systems, methods, and devices for determining reflectance properties of objects based on Lidar intensity values, A system includes one or more processors of a machine and a machine-storage medium storing instructions that, when executed by the one or more processors, cause the machine to perform operations comprising accessing an incoming data point output by a Lidar unit during operation of a vehicle. The operations may further include inferring, using a reflectance inference model, a reflectance value of an object based on the incoming data point. The reflectance inference model comprises a mapping of previously collected data points to a coordinate system using associated range values and raw intensity values. The operations may further include determining one or more characteristics of the object based on the inferred reflectance value.

18 Claims, 11 Drawing Sheets

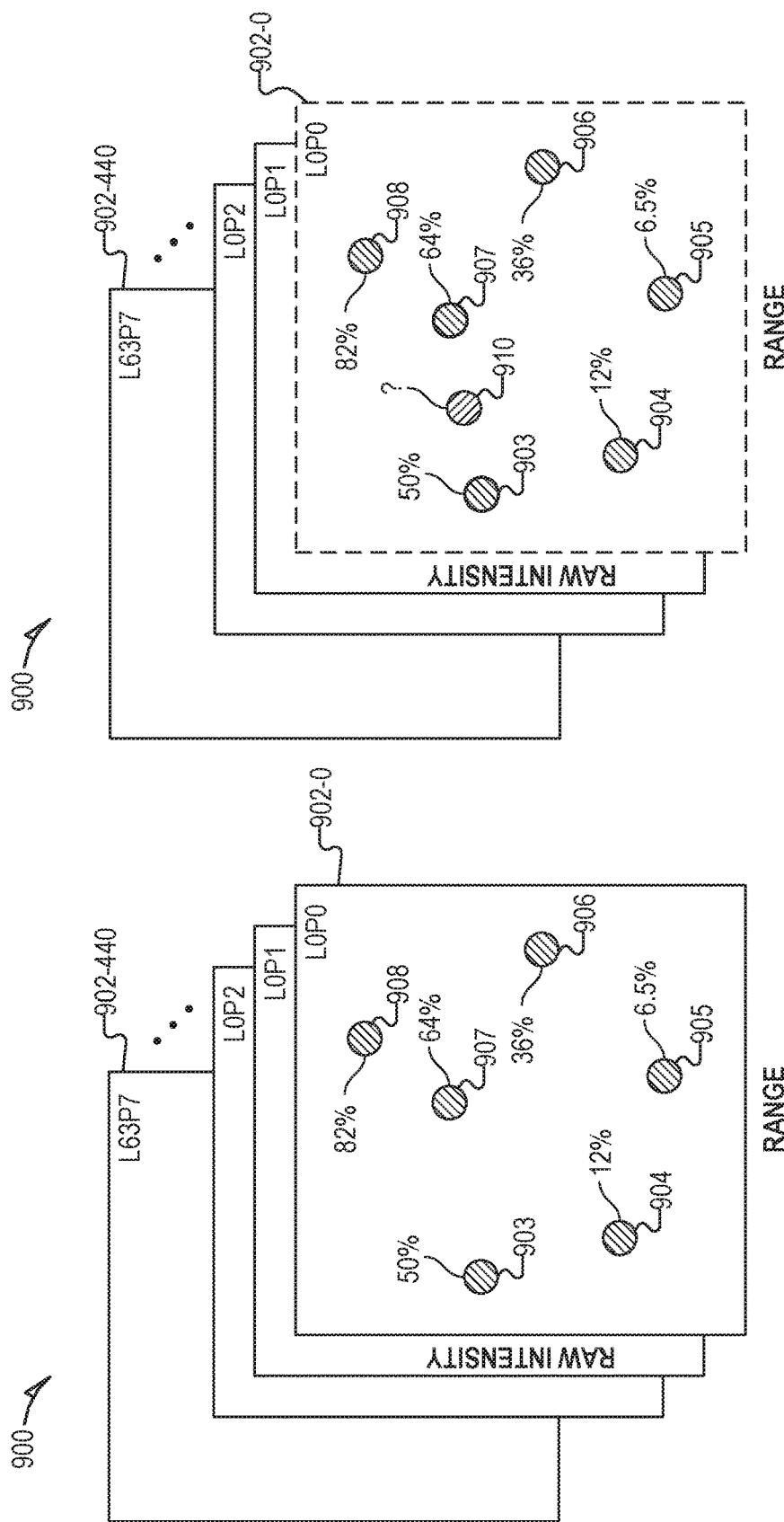

OBJECT DETECTION BASED ON LIDAR INTENSITY

PRIORITY CLAIM

This application claims the benefit of priority of U.S. Provisional Application Ser. No. 62/712,479, filed Jul. 31, 2018, which is hereby incorporated by reference in its entirety.

TECHNICAL FIELD

The subject matter disclosed herein relates to light detection and ranging (Lidar) systems. In particular, example embodiments may relate to systems and methods for object detection based on raw intensity values output by Lidar systems.

BACKGROUND

Lidar is a radar-like system that uses lasers to create three-dimensional representations of surrounding environments. A Lidar unit includes at least one laser emitter paired with a detector to form a channel, though an array of channels may be used to expand the field of view of the Lidar unit. During operation, each channel emits a laser signal into the environment that is reflected off of the surrounding environment back to the detector. A single channel provides a single point of ranging information. Collectively, channels are combined to create a point cloud that corresponds to a three-dimensional representation of the surrounding environment. The Lidar unit also includes circuitry to measure the time of flight—i.e., the elapsed time from emitting the laser signal to detecting the return signal. The time of flight is used to determine the distance of the Lidar unit to the detected object.

Some Lidar units also measure the intensity of the return signal. The intensity of the return signal provides information about the reflectance of the surface reflecting the signal and can be used for object detection. The intensity of the return signal depends on a number of factors, such as the distance of the Lidar unit to the detected object, the angle of incidence of the emitted laser signal, the temperature of the surrounding environment, and the actual reflectance of the detected object. Other factors, such as the alignment of the emitter and detector pairs, add signal noise that may further impact the uniformity of intensity values output by each channel.

Increasingly, Lidar is finding applications in autonomous vehicles (AVs) such as partially or fully autonomous cars. Frequently, the intensity values returned by each Lidar channel are used in the localization, perception, prediction, and motion planning of AVs because these signals provide information related to the reflectance of detected objects. However, given the lack of uniformity of Lidar intensity values caused by signal noise and the other factors that impact intensity of return signals described above, use of the raw intensity values provided by the Lidar unit often leads to inaccuracies and other problems with localization, perception, prediction, and motion planning for autonomous and semi-autonomous vehicles.

BRIEF DESCRIPTION OF THE DRAWINGS

Various ones of the appended drawings merely illustrate example embodiments of the present inventive subject matter and cannot be considered as limiting its scope.

FIGS. 9A-9D are conceptual diagrams illustrating an example process for inferring a reflectance value based on an incoming Lidar data point, according to some embodiments.

DETAILED DESCRIPTION

Figure 1:
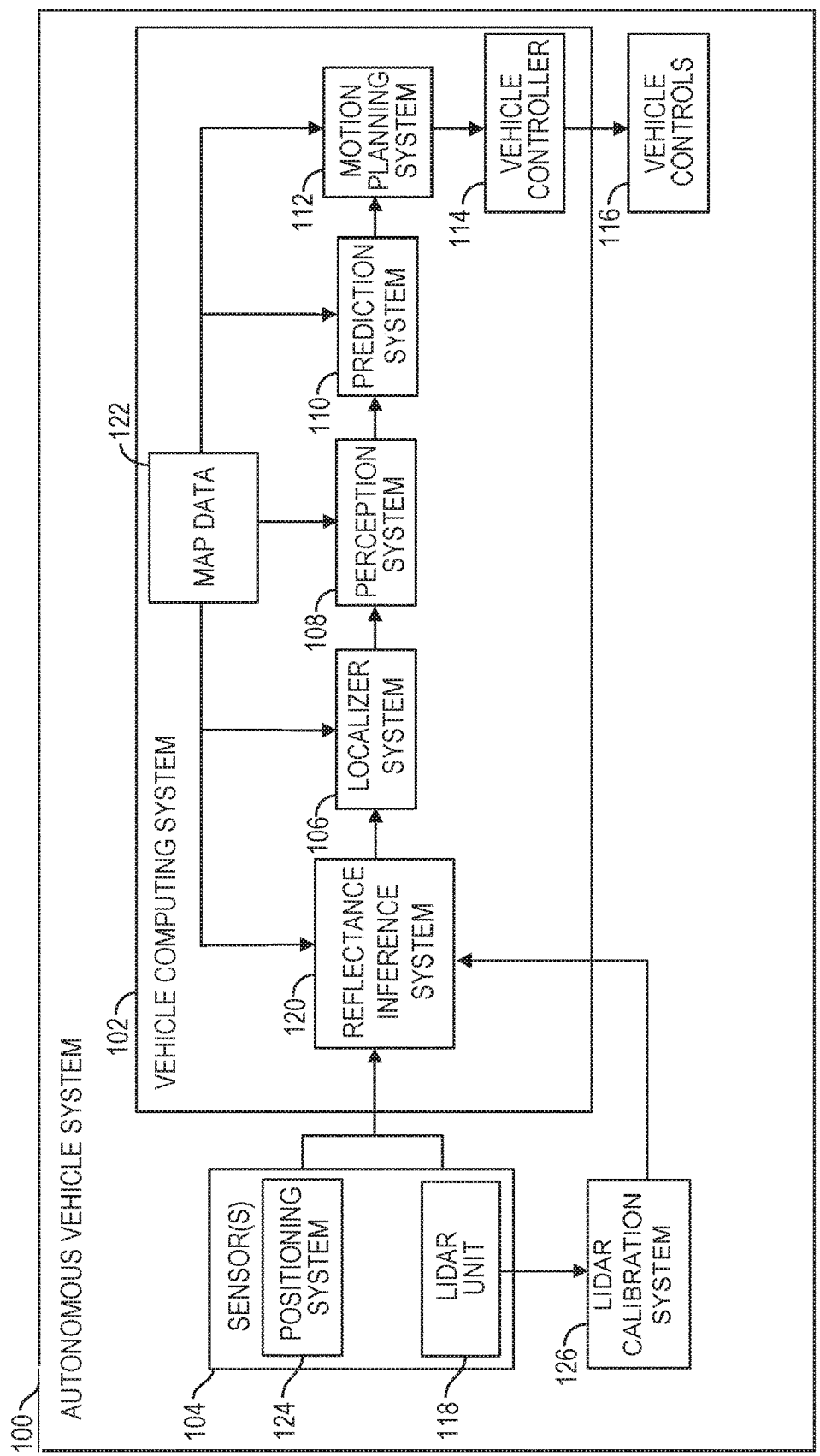
FIG. 1 is a block diagram illustrating an example autonomous vehicle (AV) system, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve systems, methods, and devices for determining object reflectance based on raw intensity values obtained from a Lidar unit. A method for determining object reflectance may be divided into a calibration phase and a vehicle operation phase. During the calibration phase, a Lidar calibration system collects a data set comprising a plurality of data points output by a Lidar unit and generates a reflectance inference model specific to the Lidar unit based on the collected data. Each data point in the collected data set comprises a raw intensity value and a range value, and corresponds to one of multiple known reflectance values. The reflectance inference model may be used by an autonomous vehicle (AV) computer system during the vehicle operation phase to infer object reflectance based on incoming data points output by the Lidar unit. The generating of the reflectance inference model includes mapping each data point to a coordinate system using the raw intensity value and range value of each data point. A mapping of data points may be generated for each power level of each channel of the Lidar unit. Thus, the generating of the reflectance inference model may comprise generating multiple mappings.

In the vehicle operation phase, a reflectance inference system of the AV computer system uses the reflectance inference model to infer reflectance values of one or more objects based on incoming data points output by the Lidar unit during operation of the AV. An inferred reflectance value indicates a reflectance of the object (e.g., a measure of a proportion of light striking the object that is reflected off of the object). The reflectance inference system determines one or more characteristics of the objects based on the inferred reflectance values. For example, the reflectance inference system may determine a reflectance of an object based on an inferred reflectance value. As another example, an inferred reflectance value may be used as a basis for determining diffuse or specular reflectance properties.

During the vehicle operation phase, the inferred reflectance value of the object may also be used in downstream perception, prediction, and motion planning. For example, a component of the AV computing system may determine a motion plan for the AV based on the inferred reflectance value of the object. The motion plan controls motion of the AV. In addition, a component of the AV computing system may generate state data that describes the object based on the inferred reflectance value of the object.

In some embodiments, inferred reflectance values may also be used in vehicle localization processes. For example, a map may be generated to include indications of inferred reflectance, and a localization system of one or more AVs may use the map in conjunction with other sensor data to generate vehicle poses that describe the position and orientation of the AV.

The collecting of the data set used to generate the reflectance inference model may include arranging multiple targets at various distances from the Lidar unit and collecting data points corresponding to each target from the Lidar unit. Each target has a known reflectance, and thus, each data point has an associated known reflectance value. The data points collected for each target include data points output by each channel of the Lidar unit at each power level of the Lidar unit. In some embodiments, the Lidar unit may be mounted on a gimbal, and the gimbal may be used to orient the Lidar unit at various angles relative to the multiple targets to obtain data points for each target at multiple angles of orientation.

In some embodiments, the inferring of reflectance values includes accessing an incoming data point output by the Lidar unit during operation of the AV, and mapping the incoming data point to the coordinate system. The incoming data point may be mapped within a particular mapping that corresponds to the power level of the channel that output the data point. A reflectance value for an object to which the data point corresponds is inferred through interpolation from two or more of the data point's nearest neighbors identified from the mapping.

In other embodiments, the generating of the reflectance inference model includes generating a look-up table that includes reflectance values for multiple combinations of range and raw intensity values for each power level of each channel of the Lidar unit. The reflectance values may be determined through interpolation from the mapped data points. The look-up table may be compressed prior to being stored on the computing system of the AV, thereby reducing the amount of memory needed to store this data. Consistent with these embodiments, the inferring of reflectance values during AV operation includes accessing the look-up table and determining the reflectance value from the look-up table based on the range value, raw intensity value, power level, and channel corresponding to the data point. By pre-computing the reflectance values during the calibration phase rather than inferring the reflectance values during vehicle operation, the processing time of the AV computer system in inferring object reflectance is reduced compared to the embodiment discussed above, and thus, the reaction time of the AV system (e.g., in avoiding the object) may be improved.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the AV system 100 to facilitate additional functionality that is not specifically described herein.

The AV system 100 is responsible for controlling a vehicle. The AV system 100 is capable of sensing its environment and navigating without human input. The AV system 100 can include a ground-based autonomous vehicle (e.g., car, truck, bus, etc.), an air-based autonomous vehicle (e.g., airplane, drone, helicopter, or other aircraft), or other types of vehicles (e.g., watercraft).

The AV system 100 includes a vehicle computing system 102, one or more sensors 104, and one or more vehicle controls 116. The vehicle computing system 102 can assist in controlling the AV system 100. In particular, the vehicle computing system 102 can receive sensor data from the one or more sensors 104, attempt to comprehend the surrounding environment by performing various processing techniques on data collected by the sensors 104, and generate an appropriate motion path through such a surrounding environment. The vehicle computing system 102 can control the one or more vehicle controls 116 to operate the AV system 100 according to the motion path.

As illustrated in FIG. 1, the vehicle computing system 102 can include one or more computing devices that assist in controlling the AV system 100. The vehicle computing system 102 can include a localizer system 106, a perception system 108, a prediction system 110, a motion planning system 112, and a reflectance inference system 120 that cooperate to perceive the dynamic surrounding environment of the AV system 100 and determine a trajectory describing a proposed motion path for the AV system 100. The vehicle computing system 102 can additionally include a vehicle controller 114 configured to control the one or more vehicle controls 116 (e.g., actuators that control gas flow (propulsion), steering, braking, etc.) to execute the motion of the AV system 100 to follow the trajectory.

In particular, in some implementations, any one of the localizer system 106, the perception system 108, the prediction system 110, the motion planning system 112, or the reflectance inference system 120 can receive sensor data from the one or more sensors 104 that are coupled to or otherwise included within the AV system 100. As examples, the one or more sensors 104 can include a Lidar unit 118, a Radio Detection and Ranging (RADAR) system, one or more cameras (e.g., visible spectrum cameras, infrared cameras, etc.), and/or other sensors. The sensor data can include information that describes the location of objects within the surrounding environment of the AV system 100.

As one example, for the Lidar unit 118, the sensor data can include point data that includes the location (e.g., in three-dimensional space relative to the Lidar unit 118) of a number of points that correspond to objects that have reflected an emitted laser. For example, the Lidar unit 118 can measure distances by measuring the time of flight (Tof) that it takes a short laser pulse to travel from the sensor(s)

104 to an object and back, calculating the distance from the known speed of light. The point data further includes an intensity value for each point, which, as described above, can provide information about the reflectiveness of the objects that have reflected the emitted laser.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 124. The positioning system 124 can determine a current position of the AV system 100. The positioning system 124 can be any device or circuitry for analyzing the position of the AV system 100. For example, the positioning system 124 can determine position by using one or more of inertial sensors; a satellite positioning system, based on Internet Protocol (1P) address, by using triangulation and/or proximity to network access points or other network components (e.g., cellular towers, Win access points, etc.); and/or other suitable techniques. The position of the AV system 100 can be used by various systems of the vehicle computing system 102.

Thus, the one or more sensors 104 can be used to collect sensor data that includes information that describes the location (e.g., in three-dimensional space relative to the AV system 100) of points that correspond to objects within the surrounding environment of the AV system 100.

In addition to the sensor data, the localizes system 106, the perception system 108, prediction system 110, motion planning system 112, and/or the reflectance inference system 120 can retrieve or otherwise obtain map data 122 that provides detailed information about the surrounding environment of the AV system 100. The map data 122 can provide information regarding the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane; a turning lane, a bicycle lane, or other lanes within a particular roadway or other travelway); traffic control data (e.g., the location and instructions of signage, traffic lights; or other traffic control devices); and/or any other map data that provides information that assists the vehicle computing system 102 in comprehending and perceiving its surrounding environment and its relationship thereto.

In addition, according to an aspect of the present disclosure, the map data 122 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such a lane.

As shown, the Lidar unit 118 is in communication with a Lidar calibration system 126. The Lidar calibration system 126 is responsible for generating a reflectance inference model in an offline process (e.g., while the AV system 100 is not in operation). This offline process involves collecting a data set that comprises a plurality of data points output by each channel of the Lidar unit 118 at each power level at which they are capable of operating, where each data point corresponds to one of multiple targets, each of which has a known reflectance. The collected data set provides a basis for the generation of the reflectance inference model.

During operation of the AV system 100, the reflectance inference system 120 uses the reflectance inference model generated by the Lidar calibration system 126 to infer reflectance values for objects based on incoming data points output by the Lidar unit 118. A reflectance value indicates a reflectance of a corresponding object (e.g., a measure of a proportion of light striking the object that is reflected by the object). The reflectance inference system 120 may determine one or more characteristics of objects based on the inferred reflectance values. For example, the reflectance inference system 120 may determine a reflectance of an object based on an inferred reflectance value. The reflectance inference system 120 may communicate inferred reflectance values to other components of the vehicle computing system 102.

The localizer system 106 receives the map data 122, some or all of the sensor data from the sensors 104, and inferred reflectance values from the reflectance inference system 120, and generates vehicle poses for the AV system 100 based on this information. A vehicle pose describes the position and orientation of the vehicle. The position of the AV system 100 is a point in a three-dimensional space. In some examples, the position is described by values for a set of Cartesian coordinates, although any other suitable coordinate system may be used. In some examples, the vehicle orientation is described by a yaw about the vertical axis, a pitch about a first horizontal axis, and a roll about a second horizontal axis. In some examples, the localizer system 106 generates vehicle poses periodically (e.g., every second, every half second, etc.). The localizer system 106 appends time stamps to vehicle poses, where the time stamp for a pose indicates the point in time that is described by the pose. The localizer system 106 generates vehicle poses by comparing sensor data (e.g., remote sensor data) to map data 122 describing the surrounding environment of the AV system 100.

In some examples, the localizer system 106 includes one or more localizers and a pose filter. Localizers generate pose estimates by comparing remote sensor data (e.g., Lidar, RADAR, etc, data) to map data 122. The pose filter receives pose estimates from the one or more localizers as well as other sensor data such as, for example, motion sensor data from an inertial measurement unit (IMU), encoder, odometer, and the like. In some examples, the pose filter executes a Kalman filter or other machine learning algorithm to combine pose estimates from the one or more localizers with motion sensor data to generate vehicle poses.

The perception system 108 can identify one or more objects that are proximate to the AV system 100 based on sensor data received from the one or more sensors 104, inferred reflectance values provided by the reflectance inference system 120, and/or the map data 122. In particular, in some implementations, the perception system 108 can determine, for each object, state data that describes a current state of the object. As examples, the state data for each object can describe an estimate of the object's current location (also referred to as position), current speed (also referred to as velocity), current acceleration, current heading, current orientation, size/footprint (e.g., as represented by a bounding shape such as a bounding polygon or polyhedron), class (e.g., vehicle, pedestrian, bicycle, or other), yaw rate, reflectance characteristics, specular or diffuse reflectivity characteristics, and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the AV system 100 over time. In some instances, the perception system 108 updates state data for an object based on a specular reflectivity value of the object computed by the reflectance inference system 120.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the AV system 100 based at least in part on the predicted one or more future locations for the objects provided by the prediction system 110 and/or the state data for the objects provided by the perception system 108. Stated differently, given information about the current locations of objects and/or predicted future locations of proximate objects, the motion planning system 112 can determine a motion plan for the AV system 100 that best navigates the AV system 100 relative to the objects at such locations.

The motion plan can be provided by the motion planning system 112 to the vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.). Nonetheless, the vehicle controller 114 can function to keep the AV system 100 reasonably close to the motion plan.

More particularly, the vehicle controller 114 can be configured to control motion of the AV system 100 to follow the motion plan. The vehicle controller 114 can control one or more of propulsion and braking of the AV system 100 to follow the motion plan. The vehicle controller 114 can also control steering of the AV system 100 to follow the motion plan. In some implementations, the vehicle controller 114 can be configured to generate one or more vehicle actuator commands and to further control one or more vehicle actuators provided within the vehicle controls 116 in accordance with the vehicle actuator command(s). Vehicle actuators within the vehicle controls 116 can include, for example, a steering actuator, a braking actuator, and/or a propulsion actuator.

Each of the localizer system 106, the perception system 108, the prediction system 110, the motion planning system 112, the reflectance inference system 120, and the vehicle controller 114 can include computer logic utilized to provide desired functionality. In some implementations, each of the localizer system 106, the perception system 108, the prediction system 110, the motion planning system 112, the reflectance inference system 120, and the vehicle controller 114 can be implemented in hardware, firmware, and/or software controlling a general-purpose processor. For example, in some implementations, each of the localizer system 106, the perception system 108, the prediction system 110, the motion planning system HO, the motion planning system 112, the reflectance inference system 120, and the vehicle controller 114 includes program files stored on a storage device, loaded into a memory, and executed by one or more processors. In other implementations, each of the localizer system 106, the perception system 108, the prediction system 110, the motion planning system 112, the reflectance inference system 120, and the vehicle controller 114 includes one or more sets of computer-executable instructions that are stored in a tangible computer-readable storage medium such as random-access memory (RAM), a hard disk, or optical or magnetic media.

Figure 2:
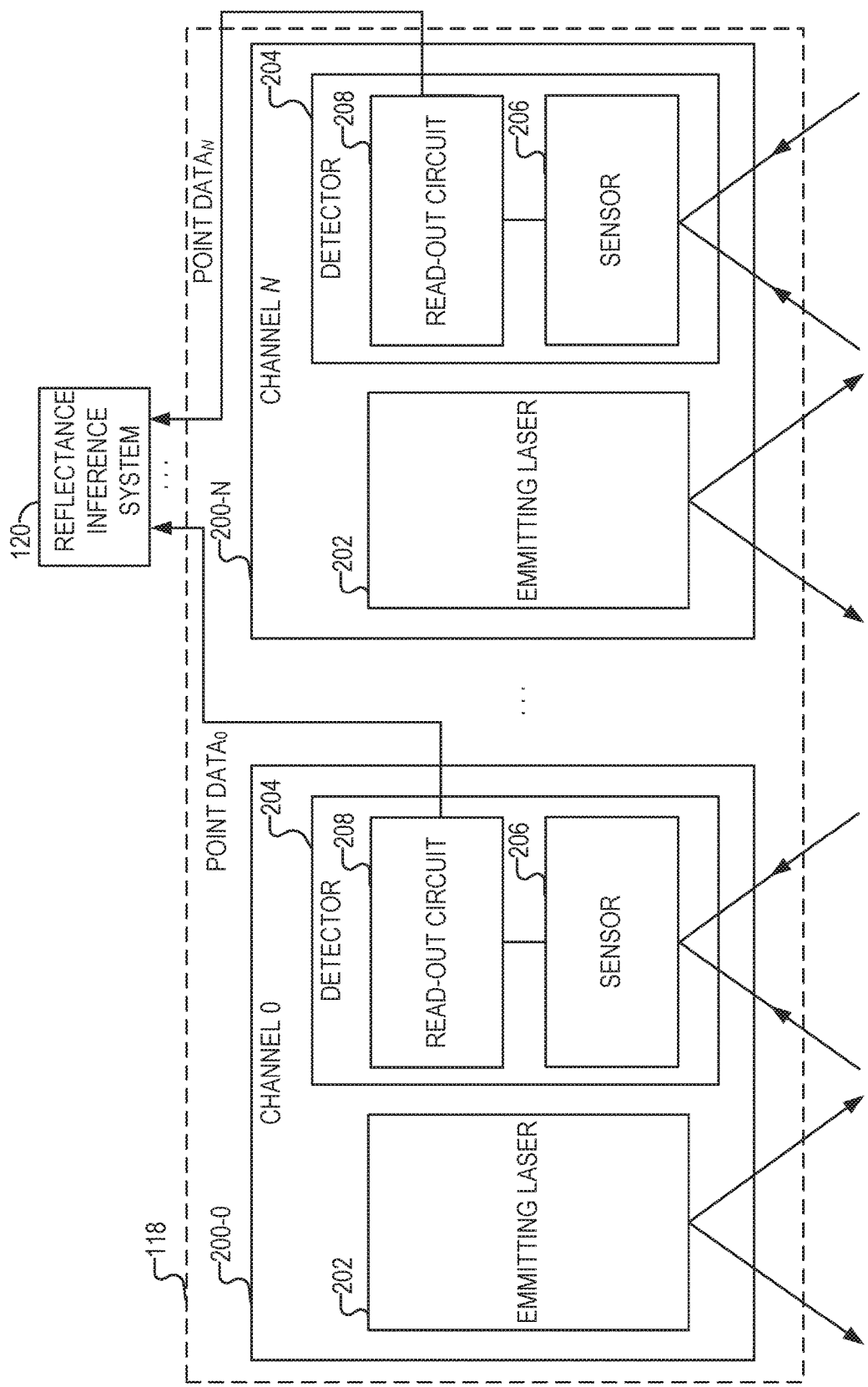
FIG. 2 is a block diagram illustrating a Lidar unit, which may be included as part of the AV system, according to some embodiments.
Figure 3:
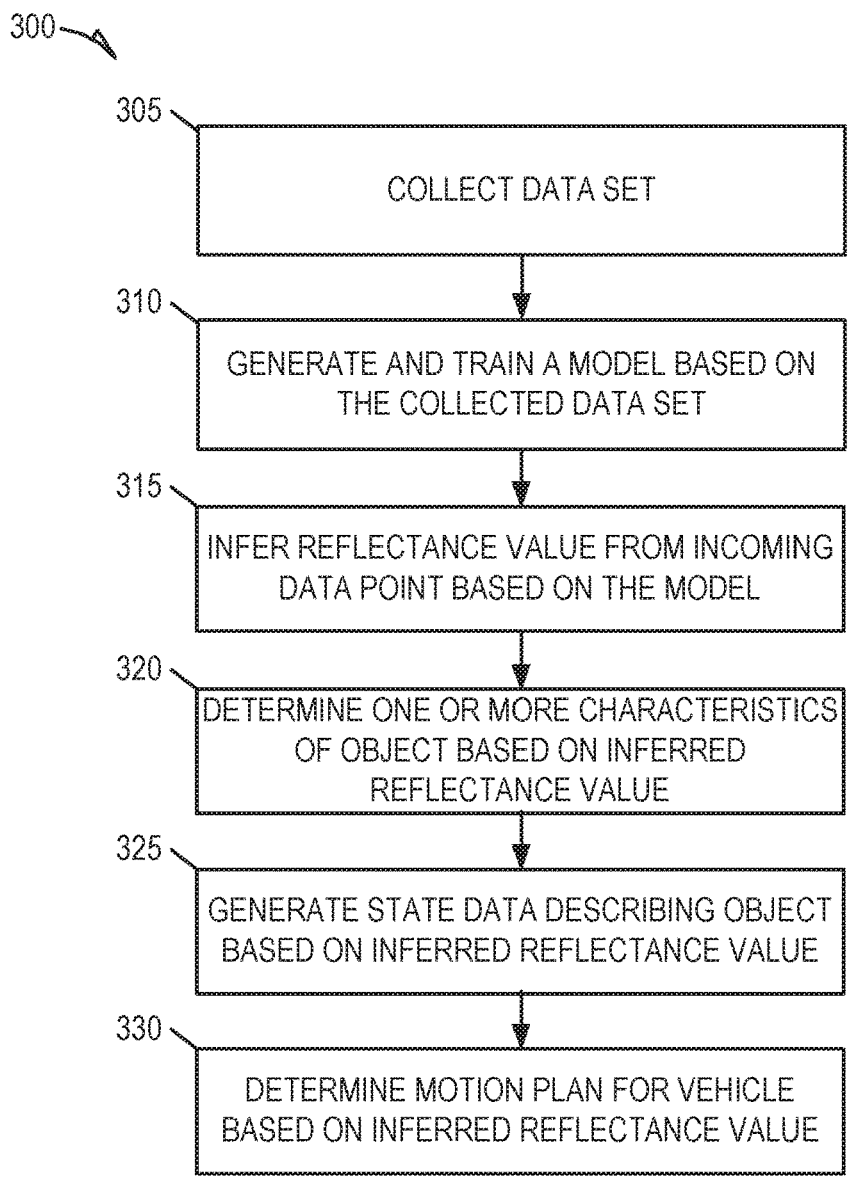
FIGS. 3-6 are flowcharts illustrating example operations performed as part of a method for determining object characteristics based on a reflectance value inferred based on a raw Lidar intensity value, according to some embodiments.

FIG. 2 is a block diagram illustrating the Lidar unit 118, which may be included as part of the AV system 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar unit 118 to facilitate additional functionality that is not specifically described herein.

As shown, the Lidar unit 118 comprises channels 200-0 to 200-N; thus, the Lidar unit 118 comprises channels 0 to N. Each of the channels 200-0 to 200-N outputs point data that provides a single point of ranging information. Collectively, the point data output by each of the channels 200-0 to 200-N (i.e., point data$_{0-N}$) is combined to create a point cloud that corresponds to a three-dimensional representation of the surrounding environment.

Each of the channels 200-0 to 200-N comprises an emitter paired with a detector 204. The emitter 202 emits a laser signal into the environment that is reflected off the surrounding environment and returned back to a sensor 206 (e.g., an optical detector) in the detector 204. Each emitter 202 may have an adjustable power level that controls an intensity of the emitted laser signal. The adjustable power level allows the emitter 202 to be capable of emitting the laser signal at one of multiple different power levels (e.g., intensities).

The sensor 206 provides the return signal to a read-out circuit 208, and the read-out circuit 208, in turn, outputs the point data based on the return signal. The point data comprises a distance of the Lidar unit 118 from a detected surface (e.g., a road) that is determined by the read-out circuit 208 by measuring the ToF, which is the time elapsed between the emitter 202 emitting the laser signal and the detector 204 detecting the return signal.

The point data further includes an intensity value corresponding to each return signal. The intensity value indicates a measure of intensity of the return signal determined by the read-out circuit 208. As noted above, the intensity of the return signal provides information about the surface reflecting the signal and can be used by any one of the localizer system 106, perception system 108, prediction system 110, and motion planning system 112 for localization, perception, prediction, and motion planning. The intensity of the return signal depends on a number of factors, such as the distance of the Lidar unit 118 to the detected surface, the angle of incidence at which the emitter 202 emits the laser signal, the temperature of the surrounding environment, the alignment of the emitter 202 and the detector 204, and the reflectivity of the detected surface.

As shown, the point data (i.e., point data$_{0-N}$) output by the channels 200-0 to 200-N of the Lidar unit 118 is provided to the reflectance inference system 120. As will be discussed in further detail below, the reflectance inference system 120 uses a reflectance inference model generated by the Lidar calibration system 126 to infer reflectance values of objects from the point data, and the reflectance inference system 120 uses the inferred reflectance values to determine one or more characteristics of the objects.

FIGS. 3-6 are flowcharts illustrating example operations performed as part of a method 300 for determining object characteristics based on a reflectance value inferred based on a raw Lidar intensity value, according to some embodiments. At least a portion of the operations of the method 300 may be embodied in computer-readable instructions for execution by a hardware component (e.g., a processor) such that these operations may be performed by one or more components of the AV system 100. Accordingly, the method 300 is described below, by way of example, with reference thereto. However, it shall be appreciated that the method 300 may be deployed on various other hardware configurations and is not intended to be limited to deployment on the AV system 100. The method 300 may be conceptually split into two phases—1) an offline calibration phase; and 2) a vehicle operation phase. Operations 305 and 310 form the offline calibration phase, and operations 315, 320, 325, and 330 form the vehicle operation phase.

At operation 305, the Lidar calibration system 126 collects a data set comprising a plurality of data points output by the Lidar unit 118. Each data point comprises a raw intensity value and a range value. The raw intensity value includes a measure of intensity of a return signal, and the range value includes a measure of distance from the Lidar unit 118 to a surface or object that reflected an emitted light signal. Each data point corresponds to one of multiple targets. Each target has a known reflectance value, and thus, each data point is associated with a known reflectance value.

The collecting of the data set may include collecting data points corresponding to each target of the multiple targets. The collecting of data points for each target may include collecting data points output by each of the channels 200-0 to 200-N of the Lidar unit 118. The collecting of the data points output by each of the channels 200-0 to 200-N may include collecting data points output at each power level of each of the channels 200-0 to 200-N. Further, the collecting of the data points output at each power level of each of the channels 200-0 to 200-N may include collecting data points output by the Lidar unit 118 while the Lidar unit 118 is positioned at various angles relative to the multiple targets. In other words, the collecting of the data set may include collecting data points output at each power level of each of the channels 200-0 to 200-N of the Lidar unit 118 while positioning the Lidar unit 118 at various angles relative to the multiple targets. Thus, the collected data set may include multiple sets of data points, and the multiple sets of data points include a set of data points corresponding to each power level of each of the channels 200-0 to 200-N of the Lidar unit 118. A set of data points corresponding to a particular power level of a particular one of the channels 200-0 to 200-N includes multiple data points corresponding to each target, and the multiple data points includes data points output by the Lidar unit 118 while being positioned at multiple angles relative to each target.

At operation 310, the Lidar calibration system 126 generates and trains a reflectance inference model for the Lidar unit 118 based on the collected data set. The reflectance inference model comprises at least one mapping of the plurality of data points to a coordinate system using the range and raw intensity values of each data point as coordinates. Within the mapping, known reflectance values (e.g., corresponding to the multiple targets) of the data points are associated with coordinates based on the range and raw intensity values of each data point. Further details regarding the generation of the reflectance model are described below in reference to FIGS. 5, 6, and 9A-9D.

In the vehicle operation phase, the reflectance inference system 120 uses the reflectance inference model to infer a reflectance value of an object from an incoming data point output by the Lidar unit 118 during operation of the vehicle (operation 315). The incoming data point is output by the Lidar unit 118 in response to the object reflecting an emitted light signal back to the Lidar unit 118. The incoming data point comprises a range value and a raw intensity value. The reflectance value indicates a measure of reflectance of the object (e.g., a measure of a proportion of light striking the object that is reflected off of the object). The reflectance value may be inferred based on a local interpolation performed on a mapping of data points included in the reflectance inference model (e.g., the mapping of data points that corresponds to a power level of the channel 200 that output the incoming data point). More specifically, the reflectance value may be interpolated from at least two data points included in the mapping. Further details regarding the inferring of a reflectance value using the reflectance inference model are described below in reference to FIGS. 5, 6, and 9A-9D.

At operation 320, one or more components of the vehicle computing system 102 determine one or more characteristics of the object based on the inferred reflectance value. For example, the reflectance inference system 120 may determine a reflectance of an object based on the inferred reflectance value. As another example, the reflectance inference system 120 may use the inferred reflectance value as a basis for determining diffuse or specular reflectance properties of the object. The inferred reflectance value may also be used by the perception system 108 to determine an estimate of one or more of the object's current location, current speed, current acceleration, current heading, current orientation, size/footprint, class, and yaw rate. The prediction system 110 may use the inferred reflectance value to predict one or more future locations for the object.

At operation 325, the perception system 108 generates state data associated with the object to describe the object based on the inferred reflectance value. Accordingly, the state data for the object comprises a distance of the object from the Lidar unit 118 and the inferred reflectance value for the object. The state data may further include the one or more characteristics of the object determined based on the inferred reflectance value.

At operation 330, the motion planning system 112 determines a motion plan for the vehicle based on the inferred reflectance value of the object. As noted above, the vehicle controller 114 uses the motion plan to control the motion of the vehicle.

Figure 4:
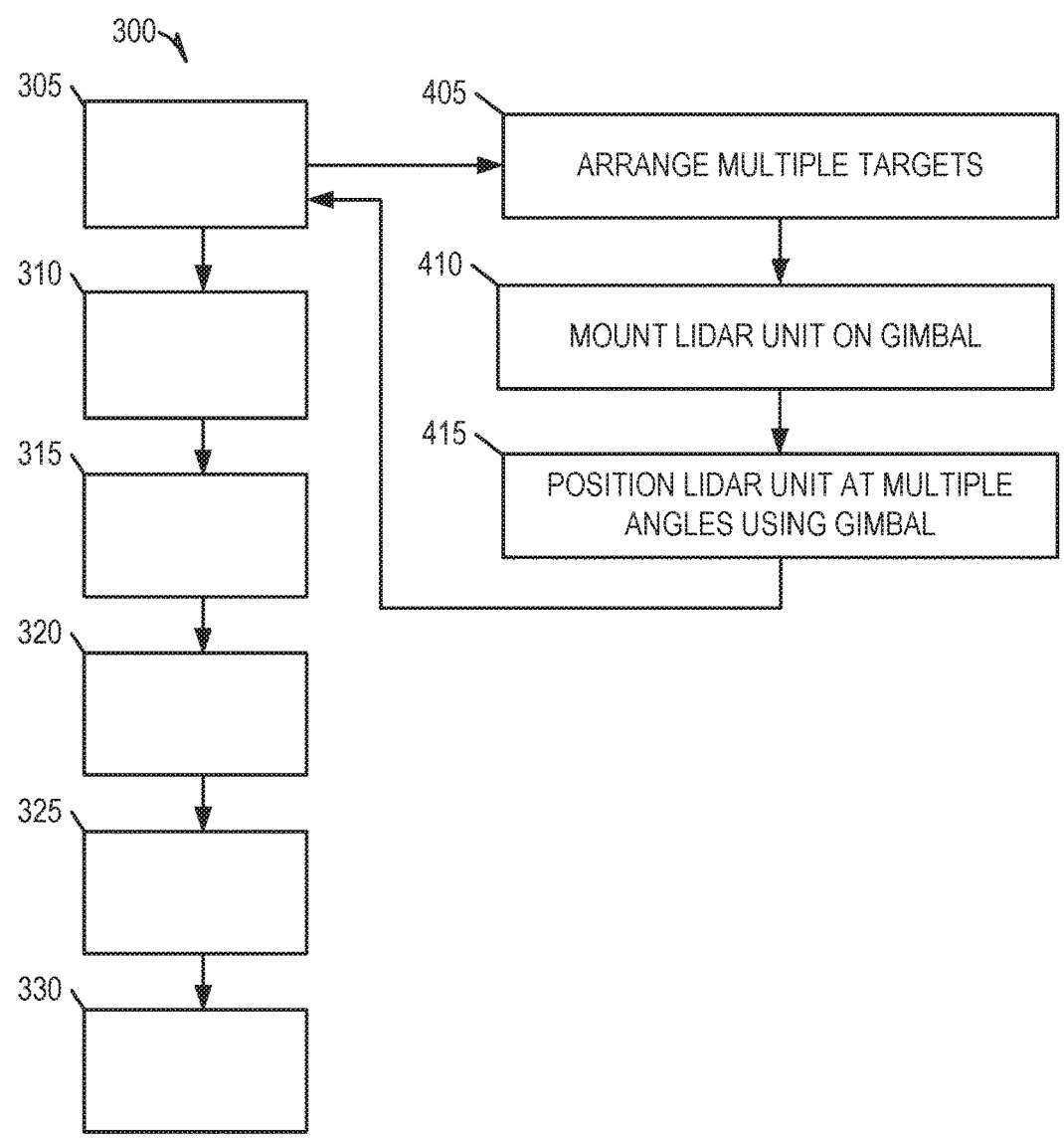

As shown in FIG. 4, the method 300 may, in some embodiments, include operations 405, 410, and 415. Consistent with these embodiments, the operations 405, 410, and 415 may be performed prior to or as part of operation 305, where the Lidar calibration system 126 collects the data set.

At operation 405, one or more human operators arrange multiple targets. Each target has a known reflectance value. The multiple targets may be arranged at various distances from the Lidar unit 118. An example arrangement of the multiple targets is described below in reference to FIG. 8.

At operation 410, one or more human operators mount the Lidar unit 118 on a gimbal. The gimbal allows the human operators to orient the Lidar unit 118 at various angles relative to the multiple targets.

At operation 415, the Lidar calibration system 126 positions the Lidar unit 118 at multiple angles relative to the multiple targets while the Lidar unit 118 outputs data points. More specifically, the Lidar calibration system 126 provides electronic commands to the gimbal to adjust the angle of the Lidar unit 118 relative to the multiple targets while the Lidar unit 118 generates data points. For example, the Lidar calibration system 126 may allows the Lidar unit 118 to generate data points corresponding to the multiple targets at a first angle before commanding the gimbal to position the Lidar unit 118 at a second angle, at which the Lidar unit 118 generates further data points. The Lidar calibration system 126 may command the gimbal to sweep through a range of angles in small increments (e.g., 0.25 degrees). As noted above, for each angle, the Lidar calibration system 126 may collect data points corresponding to each power level of each channel.

Figure 5:
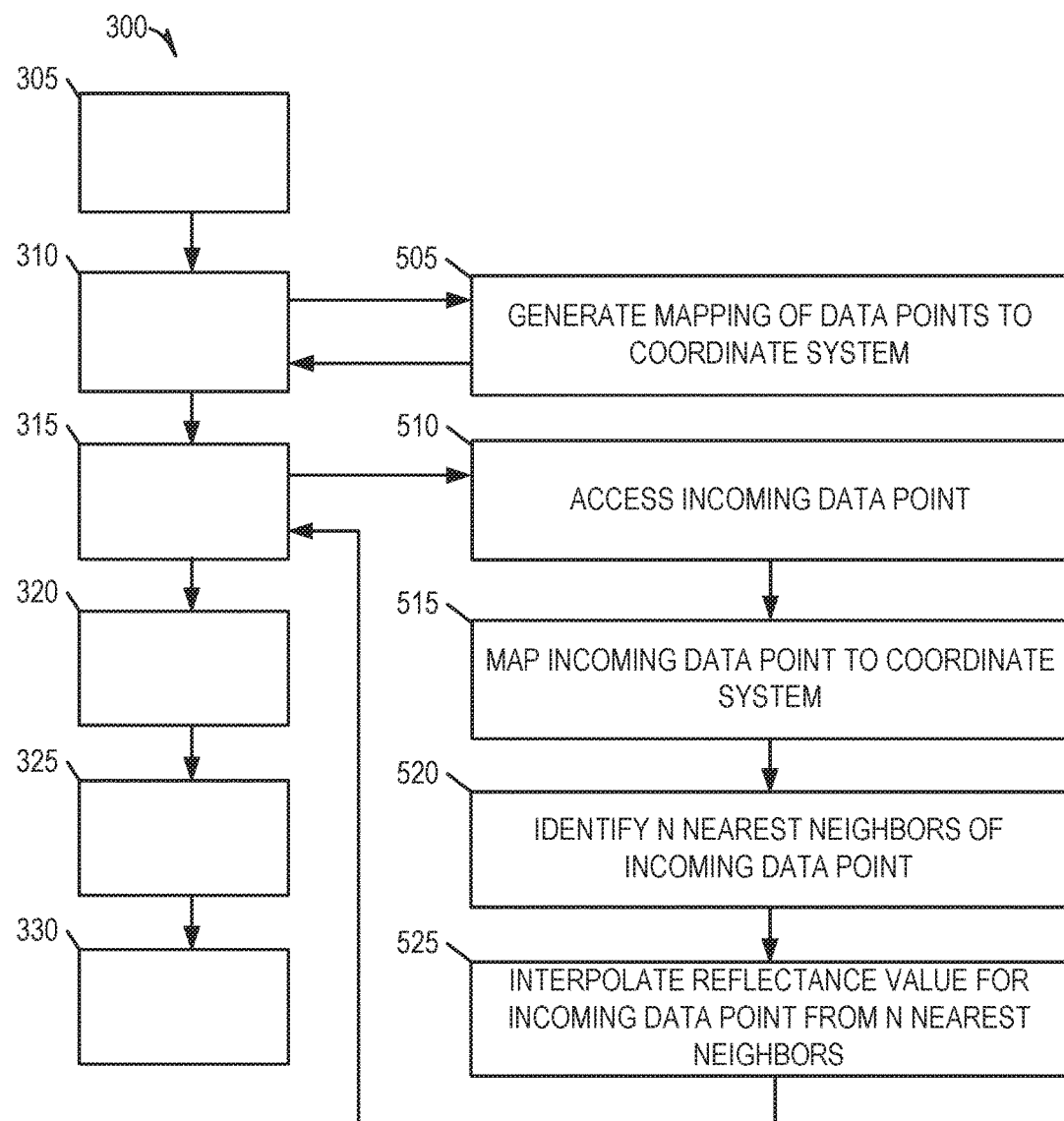

As shown in FIG. 5, the method 300 may, in some embodiments, include operations 505, 510, 515, 520, and 525. Consistent with these embodiments, the operation 505 may be performed as part of operation 310, where the Lidar calibration system 120 generates the reflectance inference model. At operation 505, the Lidar calibration system 126 generates a mapping of the plurality of data points to a coordinate system using a respective range and raw intensity value of each data point. In generating the mapping, the Lidar calibration system 126 maps each data point to the coordinate system using a range and raw intensity value of each data point. In mapping a data point to the coordinate system, the Lidar calibration system 126 associates the data point with a set of coordinates based on the range and raw intensity value of the data point, thereby associating a known reflectance value with a range value and a raw intensity value.

Consistent with some embodiments, the reflectance inference model comprises multiple mappings of data points to the coordinate system. In these embodiments, each mapping corresponds to a particular power level of a particular one of the channels 200-0 to 200-N, and thus, a particular mapping includes only data points output by a particular channel at a particular power level. Hence, the generating of the reflectance inference model performed at operation 310 may comprise generating a mapping of data points for each power level of each channel. That is, the operation 505 may be repeated for each power level of each channel.

Operations 510, 515, 520, and 525 may be performed as part of operation 315, where the reflectance inference system 120 infers the reflectance value of the object. At operation 510, the reflectance inference system 120 accesses an incoming data point output by the Lidar unit 118 during operation of the vehicle. As noted above, the incoming data point corresponds to a detected object and comprises a raw intensity value and a range value.

At operation 515, the reflectance inference system 120 maps the incoming data point to the coordinate system using the raw intensity value and range value. That is, the reflectance inference system 120 associates the incoming data point with a set of coordinates based on the raw intensity value and range value.

At operation 520, the reflectance inference system 120 identifies the K nearest neighbors of the incoming data point in the coordinate system based on the mapping of the plurality of data points to the coordinate system. In the context of operation 520, K is two or more. The reflectance inference system 120 may use one of multiple known techniques for identifying the K nearest neighbors of the incoming data point (e.g., linear search, space partitioning, locality-sensitive hashing, k-nearest neighbor, $(1+\varepsilon)$-approximate nearest neighbor search, etc.).

In embodiments in which the reflectance inference model includes multiple mappings, the inferring of the reflectance value for the object comprises selecting the mapping used to identify the nearest neighbors from the multiple mappings based on the channel of the Lidar unit 118 that output the incoming data point and the power level of the channel. In other words, the reflectance inference system 120 selects the mapping that is specific to the channel and power level corresponding to the incoming data point for use in identifying the nearest neighbors of the incoming data point.

At operation 525, the reflectance inference system 120 interpolates the reflectance value of the incoming data point from the K nearest neighbors. The reflectance inference system 120 may use any one of many known interpolation techniques to interpolate the reflectance value from the K nearest neighbors.

Figure 6:
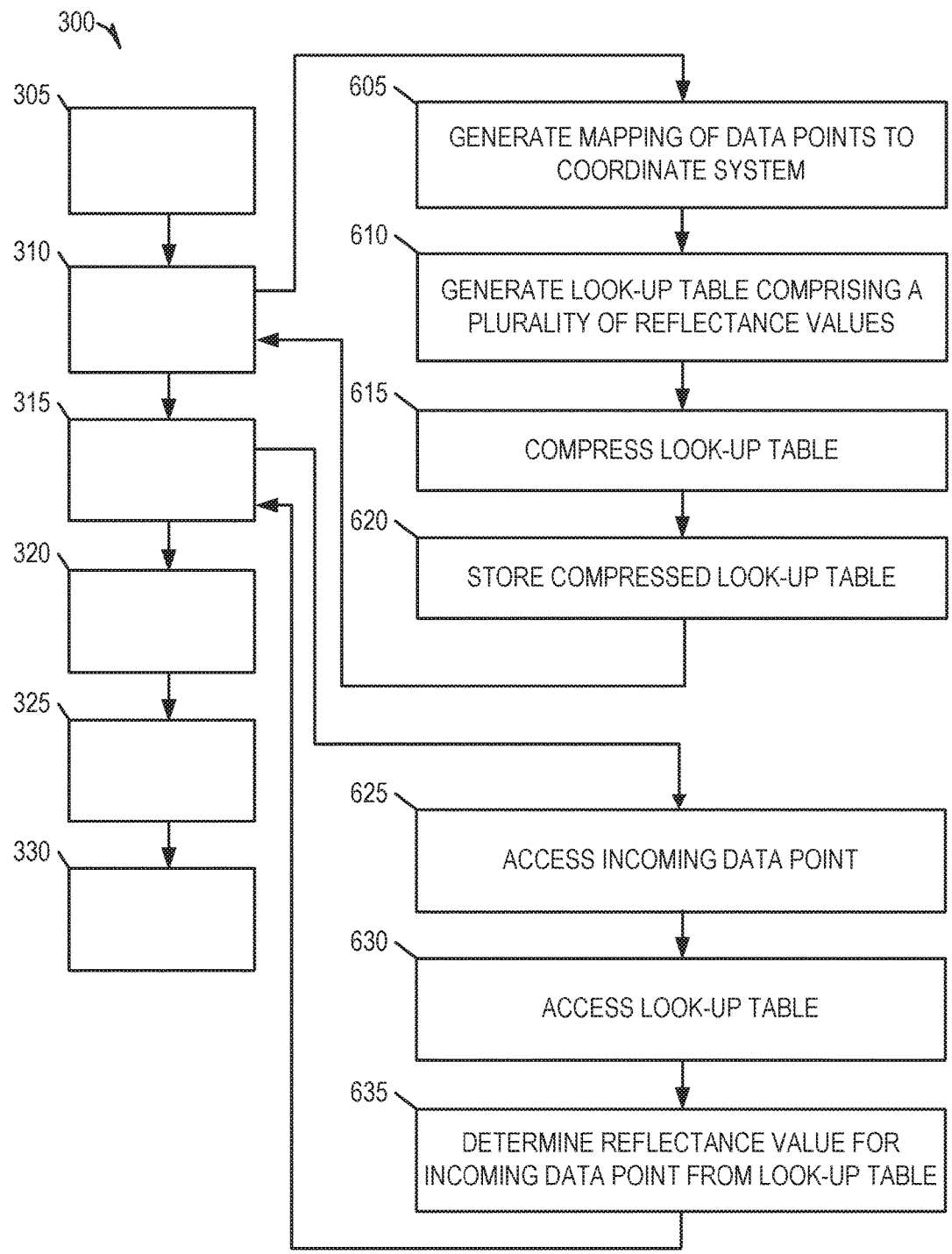

As shown in FIG. 6, the method 300 may, in some embodiments, include operations 605, 610, 615, 620, 625, 630, and 635. Consistent with these embodiments, the operations 605, 610, 615, and 620 may be performed as part of operation 310, where the Lidar calibration system 126 trains and generates the reflectance inference model.

At operation 605, the Lidar calibration system 126 generates a mapping of the plurality of data points to a coordinate system using a respective range and raw intensity value of each data point. In generating the mapping, the reflectance inference system 120 maps each data point to the coordinate system using a range and raw intensity value of each data point. In mapping a data point to the coordinate system, the reflectance inference system 120 associates the data point with a set of coordinates based on the range and raw intensity value of the data point, thereby associating a known reflectance value with a range value and a raw intensity value.

At operation 610, the Lidar calibration system 126 generates a look-up table comprising a plurality of reflectance values using the mapping. Within the look-up table, each reflectance value is associated with a combination of a range value, a raw intensity value, a channel, and a power level. The reflectance values included in the look-up table may include the known reflectance values (e.g., of the multiple targets) that are pre-associated with a combination of range and raw intensity values (e.g., by virtue of the mapping), as well as reflectance values interpolated from the mapping of the plurality of data points. Accordingly, the generating of the look-up table may comprising interpolating multiple reflectance values from the mapping of the plurality of data points.

At operation 615, the Lidar calibration system 126 compresses the look-up table. In compressing the look-up table, the reflectance inference system 120 may utilize any one of several known compression techniques or algorithms. At operation 620, the reflectance inference system 120 stores the compressed look-up table in a memory device of the vehicle computing system 102.

Consistent with these embodiments, the operations 625, 630, and 635 may be performed as part of operation 315, where the reflectance inference system 120 infers the reflectance value of the object from the incoming data point using the reflectance inference model.

At operation 625, the reflectance inference system 120 accesses an incoming data point output by the Lidar unit 118 during operation of the vehicle. As noted above, the incoming data point corresponds to a detected object and comprises a raw intensity value and a range value. At operation 630, the reflectance inference system 120 accesses the compressed look-up table from the memory device of the vehicle computing system 102.

At operation 635, the reflectance inference system 120 determines the reflectance value of the incoming data point using the look-up table. More specifically, the reflectance inference system 120 identifies the reflectance value from the look-up table using the raw intensity value and range value of the incoming data point along with a number of the channel that output the incoming data point and a power level of the channel.

Figure 7:
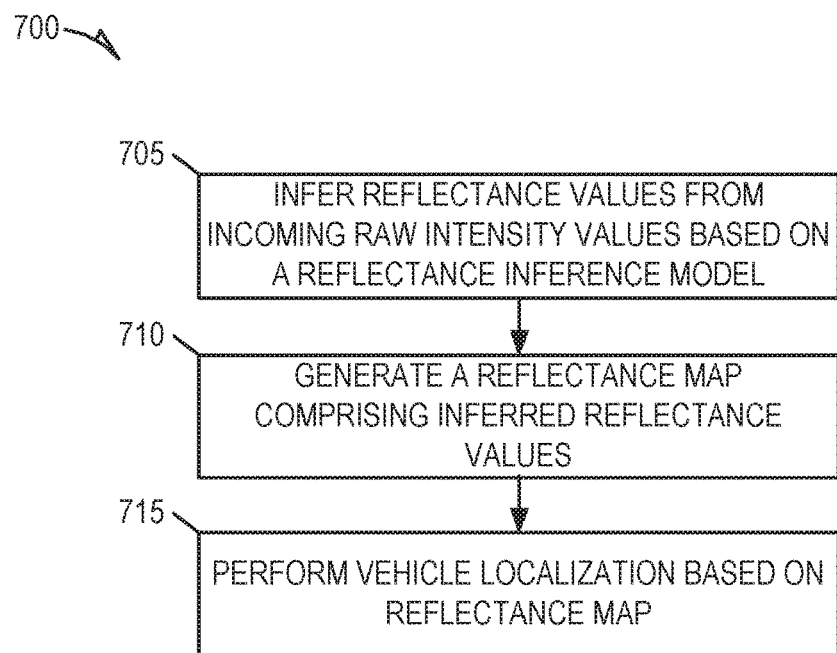
FIG. 7 is a flowchart illustrating example operations performed as part of a method for performing vehicle localization based on one or more reflectance values inferred based on raw Lidar intensity values, according to some embodiments.

FIG. 7 is a flowchart illustrating example operations performed as part of a method 700 for performing vehicle localization based on one or more reflectance values inferred based on raw Lidar intensity values, according to some embodiments. The method 700 may be embodied in computer-readable instructions for execution by a hardware component (e.g., a processor) such that the operations of the method 700 may be performed by one or more components of the AV system 100. Accordingly, the method 700 is described below, by way of example, with reference thereto. However, it shall be appreciated that the method 700 may be deployed on various other hardware configurations and is not intended to be limited to deployment on the AV system 100.

At operation 705, the reflectance inference system 120 infers reflectance values of objects from incoming data points using a reflectance inference model. The incoming data points are output by the Lidar unit 118 during operation of the vehicle. The reflectance inference system 120 may infer reflectance values in accordance with the techniques described herein.

At operation 710, the localizer system 106 generates a reflectance map comprising the inferred reflectance values of objects inferred by the reflectance inference system 120. In particular, within the reflectance map, the inferred reflectance values are associated with geolocations of the objects to which they correspond. In generating the reflectance map, the localizer system 106 may augment the map data 122 to include indications of reflectance values at the locations of the objects to which they correspond. The reflectance map may also include inferred reflectance values generated by vehicle computing systems.

At operation 715, the localizer system 106 performs vehicle localization based on the reflectance map. That is, the localizer system 106 may use the reflectance map to generate vehicle poses for the AV system 100 that describe the position and orientation of the vehicle.

Figure 8:
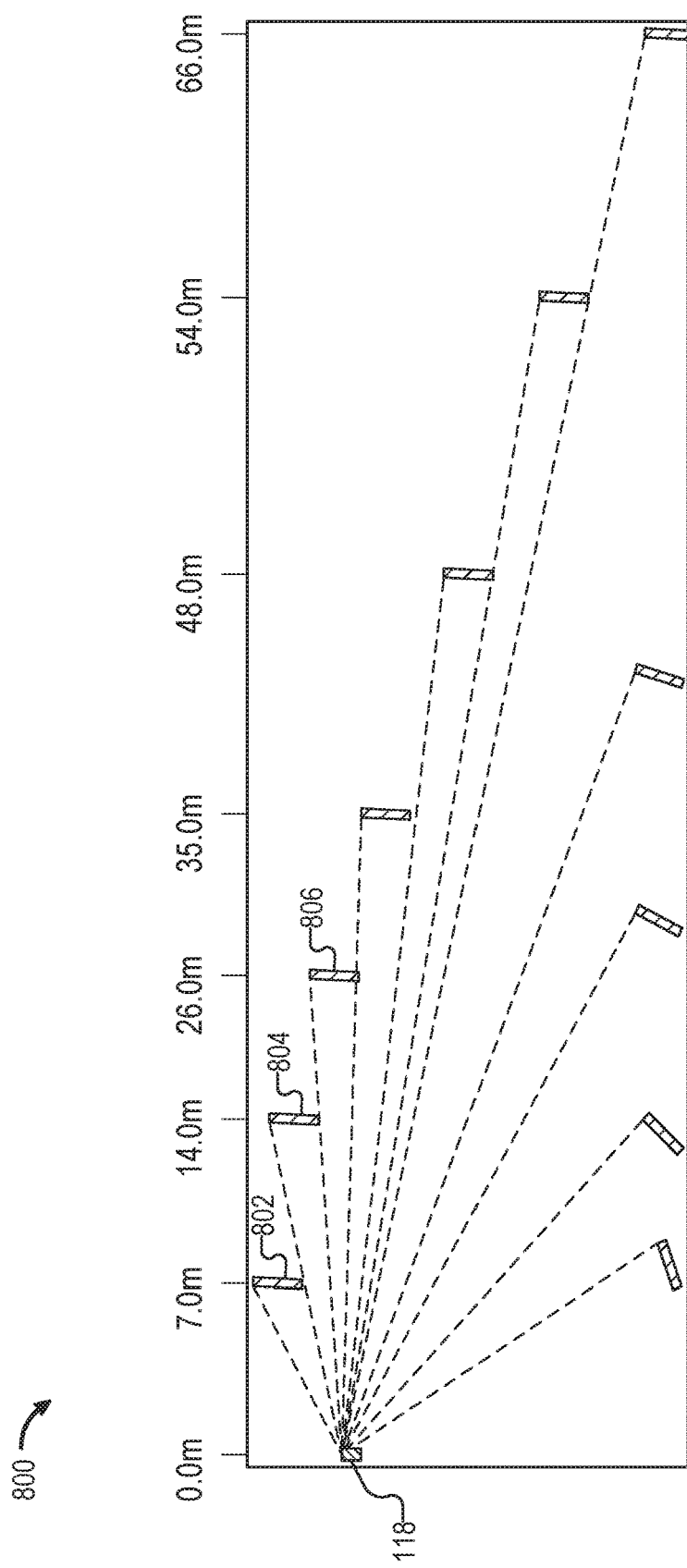
FIG. 8 is a schematic diagram illustrating an example environment in which multiple targets are arranged as part of a process for collecting a data set for use in generating a model for inferring reflectance values based on raw Lidar intensity values, according to some embodiments.

FIG. 8 is a schematic diagram illustrating an example environment 800 in which multiple targets are arranged as part of a process for collecting a data set for use in generating a reflectance inference model for the Lidar unit 118, according to some embodiments. As shown, multiple targets are arranged within the environment 800 at various distances from the Lidar unit 118. For example, a target 802 is positioned at 7 meters from the Lidar unit 118, a target 804 is positioned at 14 meters from the Lidar unit 118, and a target 806 is positioned at 26 meters from the Lidar unit 118. Each target has a known reflectance (e.g., a measure of a proportion of light striking the object that is reflected off of the object). As noted above, in collecting the data set used for generating the reflectance inference model for the Lidar unit 118, data points corresponding to each target are collected. That is, the Lidar unit 118 emits light signals directed at each target, receives return signals corresponding to reflections of the emitted light signals off each target, and outputs point data corresponding to each return signal that comprises a range value and a raw intensity value. The data points collected for each target include data points output by each of the channels 200-0 to 200-N (FIG. 2) at each power level.

Figure 9C:
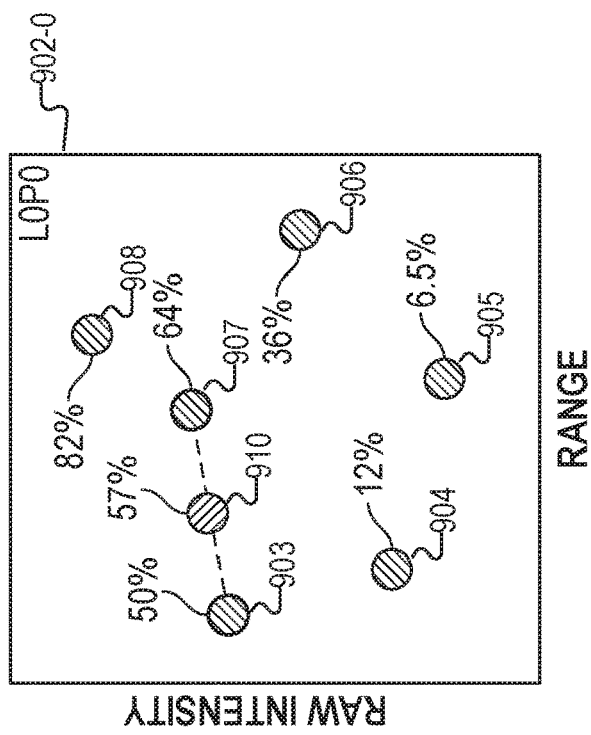

FIGS. 9A-9D are conceptual diagrams illustrating an example process for inferring a reflectance value based on an incoming data point received from the Lidar unit 118, according to some embodiments. With reference to FIG. 9A, a visual representation of a reflectance inference model 900 is shown. The reflectance inference model 900 comprises mappings 902-1 to 902-440. As noted above, the Lidar calibration system 126 may generate the reflectance inference model 900 in an offline pre-processing phase based on a set of data collected in the manner described above. As shown in FIG. 9A, the mappings 902-1 to 902-440 are visualized as a plurality of plots within a coordinate system defined by range and raw intensity.

Within each of the mappings 902-1 to 902-440, data points are mapped to a coordinate system based on range and raw intensity values associated with each data point. That is, each data point comprises a range value and a raw intensity value, and a data point within a mapping is associated with a set of coordinates using the raw intensity value and range value associated with the data point. Each data point is included in the collected data set. Further, each data point is associated with a known reflectance value (e.g., a measure of a proportion alight striking the object that is reflected off of the object) of a target (e.g., target 802, 804, or 806 of FIG. 8) to which the data point corresponds.

Each of the mappings 902-0 to 902-440 is associated with a particular power level and channel combination. In FIGS. 9A-9D, "L" is used to denote the channel associated with the mapping, and "P" is used to denote the power level of the channel. For example, the mapping 902-0 is associated with channel 0 at power level 0, and accordingly, the mapping 902-0 is labeled as "L0P0." As another example, the mapping 902-440 is associated with channel 63 at power level 7, and accordingly, the mapping 902-440 is labeled as "L63P7."

The mapping 902-0 comprises data points 903-908. Each of the data points 903-908 was output by channel 0 of the Lidar unit 118 at power level 0. As shown, each of the data points 903-908 is associated with a known reflectance of a target to which the data point corresponds. For example, the data point 903 comprises a 50% reflectance value, the data point 904 comprises a 12% reflectance value, the data point 905 comprises a 6.5% reflectance value, the data point 906 comprises a 36% reflectance value, the data point 907 comprises a 64% reflectance value, and the data point 908 comprises an 82% reflectance value.

With reference to FIG. 9B, during vehicle operation, upon receiving an incoming data point 910 output by channel 0 at power level 0 of the Lidar unit 118, the reflectance inference system 120 accesses the mapping 902-0 and maps the incoming data point to the coordinate system within the mapping 902-0. As with the previously collected data points, the incoming data point comprises a raw intensity value and a range value. The reflectance inference system 120 associates the incoming data point with a set of coordinates within the coordinate system of the mapping 902-1 using the raw intensity value and the range value of the incoming data point. As shown, a reflectance value associated with the incoming data point 910 is initially unknown.

With reference to FIG. 9C, the reflectance inference system 120 identifies the two nearest neighbors of the incoming data point 910 within the mapping 902-0, which, in this example, correspond to the data points 903 and 907. In identifying the nearest neighbors, the reflectance inference system 120 may use one of several known techniques or algorithms for identifying nearest neighbors (e.g., the k-nearest neighbors algorithm). Further, although in the context of FIG. 9C, only two nearest neighbors are identified, it shall be appreciated that any number of nearest neighbors greater than one may be utilized.

Figure 9D:
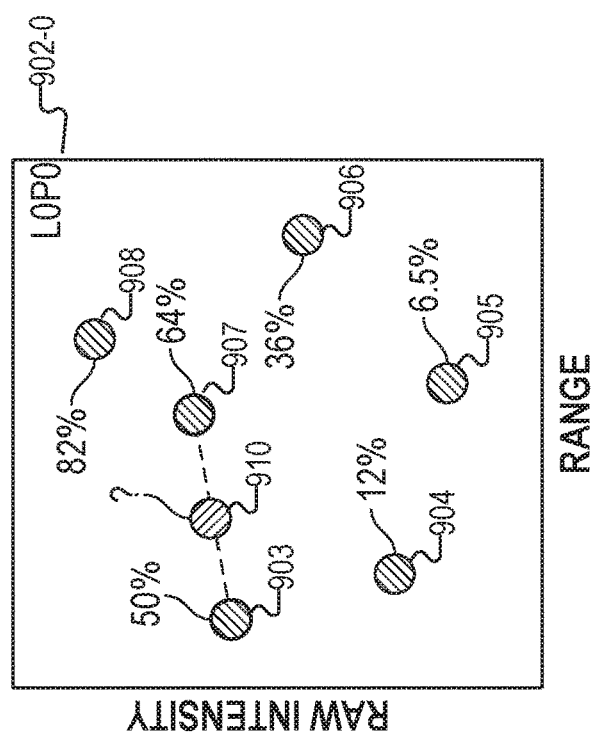

With reference to FIG. 9D, the reflectance inference system 120 interpolates a reflectance value associated with the incoming data point 910 from the nearest neighbors—the data points 903 and 907. The reflectance inference system 120 may use one of several known interpolation techniques or algorithms to interpolate the reflectance value from the data points 903 and 907. In this example, the reflectance inference system 120 determines that a reflectance value of 57% is associated with the incoming data point 910. Based on this determination, the reflectance inference system 120 infers that an object corresponding to the incoming data point 910 has a reflectance value of 57%.

Figure 10:
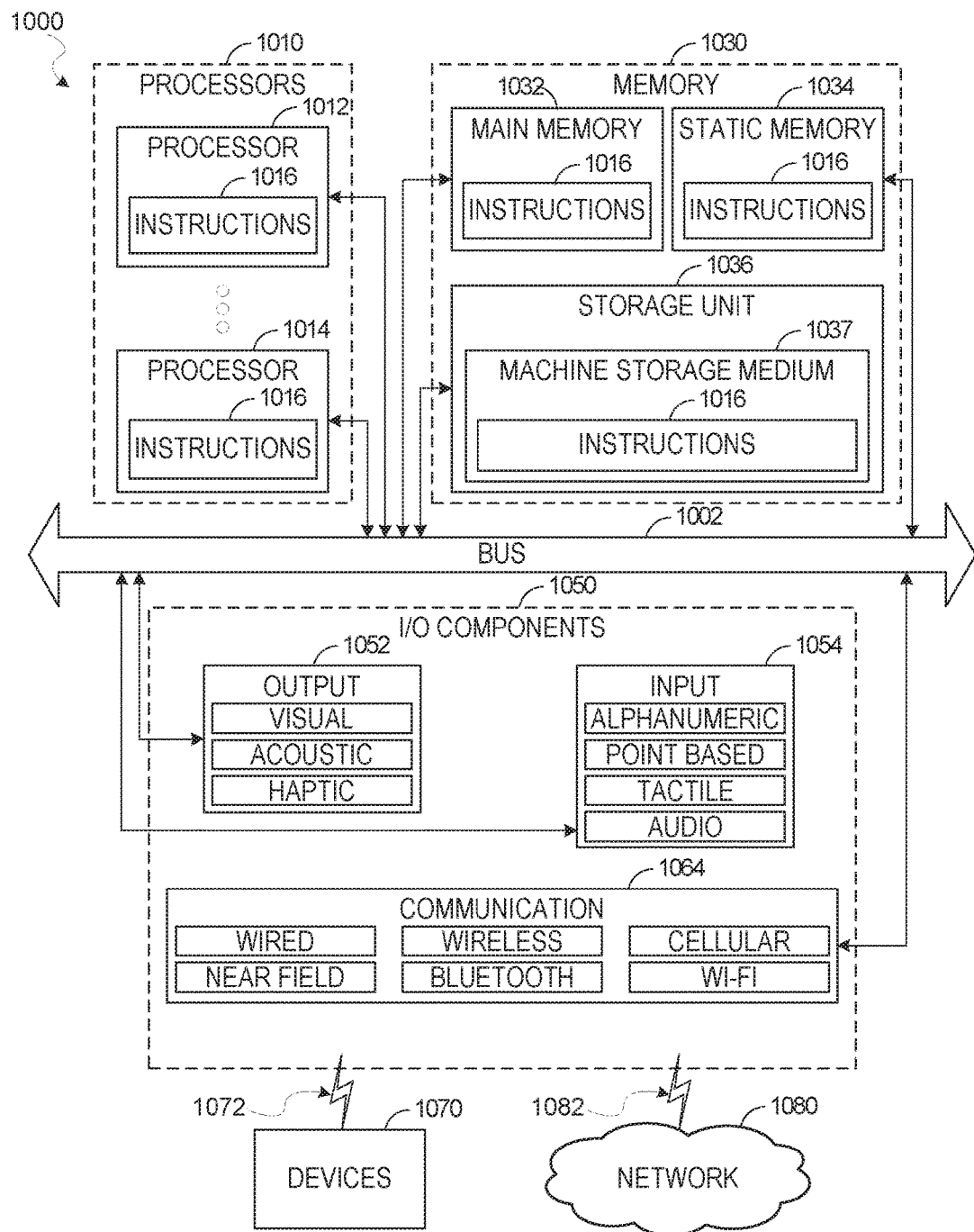
FIG. 10 is a diagrammatic representation of a machine in the example form of a computer system within which a set of instructions for causing the machine to perform any one or more of the methodologies discussed herein may be executed.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods 300 and 700. In this way, the instructions 1016 transform a general, non-programmed machine into a particular machine 1000, such as the Lidar calibration system 126 or the vehicle computing system 102, that is specially configured to carry out the described and illustrated functions in the manner described herein. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and input/output (I/O) components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036 comprising a machine storage medium 1037, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms; while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities (e.g., Bluetooth, WiFi, and NFC). The devices 1070 may be another machine or any of a wide variety of peripheral devices (e.g., a peripheral device coupled via a universal serial bus (USB)), Executable Instructions and Machine-Storage Medium The various memories (e.g., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions, when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 1080 may be an ad hoc network; an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UNITS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore; is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein; it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An autonomous vehicle (AV) computing system comprising:
 a reflectance inference system comprising one or more processors, the reflectance inference system to perform operations comprising:
 accessing an incoming data point output by a light detection and ranging (Lidar) unit during operation of the AV computing system;
 determining, using a reflectance inference model generated by a Lidar calibration system, an inferred reflectance value of an object based on the incoming data point, the reflectance inference model comprising a mapping of a set of previously collected data points to a coordinate system using range and raw intensity values of the previously collected data points as coordinates, the inferred reflectance value being interpolated from at least two previously collected data points of the set of previously collected data points mapped to the coordinate system, each of the two previously collected data points corresponding to one of multiple known reflectance values; and
 determining one or more characteristics of the object based on the inferred reflectance value; and
 a motion planning system comprising one or more processors, the motion planning system to determine a motion plan for an AV based on the one or more characteristics of the object, the motion plan being used to control motion of the AV.

2. The AV computing system of claim 1, wherein the determining of the inferred reflectance value of the object comprises:
 mapping the incoming data point to the coordinate system;
 identifying two or more nearest neighbors of the incoming data point mapped to the coordinate system, the two or more nearest neighbors including the at least two previously collected data points; and
 interpolating the reflectance value from the two or more nearest neighbors.

3. The AV computing system of claim 1, wherein:
 the reflectance inference model comprises a look-up table comprising a plurality of reflectance values interpolated from the set of previously collected data points mapped to the coordinate system, each reflectance value corresponding to a particular combination of range and raw intensity values; and
 the determining of the inferred reflectance value of the object comprises:
 accessing the look-up table; and
 determining the inferred reflectance value from the look-up table based on a raw intensity value and a range value of the incoming data point.

4. The AV computing system of claim 1, wherein:
 the Lidar unit comprises a plurality of channels, each channel being capable of operating at a plurality of power levels;
 the reflectance inference model comprises multiple mappings of the previously collected data points to the coordinate system, each of the mappings corresponding to a particular power level of a particular channel of the Lidar unit; and
 the determining of the inferred reflectance value of the object comprises selecting the mapping of the set of previously collected data points from the multiple mappings based on a channel of the Lidar unit that output the incoming data point and a power level of the channel.

5. The AV computing system of claim 1, wherein the operations further comprise generating state data that describes the object, the state data comprising at least the inferred reflectance value.

6. The AV computing system of claim 1, wherein the operations further comprise:
 generating a reflectance map that includes an indication of the inferred reflectance value of the object; and
 performing vehicle localization based on the reflectance map.

7. The AV computing system of claim 1, wherein the operations further comprise:
 collecting a data set comprising data points output by the Lidar unit, each of the data points corresponding to one of multiple targets, each target having one of the multiple known reflectance values, the data set corresponding to the set of previously collected data points; and
 generating the reflectance inference model for the Lidar unit based on the data set, the generating of the reflectance inference model comprising mapping the set of previously collected data points to the coordinate system.

8. A light detection and ranging (Lidar) calibration system comprising:
 one or more processors of a machine; and a machine-storage medium storing instructions that, when executed by the one or more processors, cause the machine to perform operations comprising:

collecting a data set comprising a plurality of data points output by a Lidar unit, each of the data points corresponding to one of multiple targets, each target having a known reflectance value, each channel of the Lidar unit being capable of operating at a plurality of power levels, the collecting of the data set including collecting data points output by each channel at each power level; and generating a reflectance inference model for the Lidar unit based on the data set, the generating of the reflectance inference model comprising mapping the plurality of data points to a coordinate system using range and raw intensity values of each data point as coordinates, the reflectance inference model operable to infer reflectance values from incoming data points output by the Lidar unit, the generating of the reflectance inference model includes generating multiple mappings of the plurality of data points to the coordinate system, each mapping corresponding to a particular power level of a particular channel.

9. The Lidar calibration system of claim 8, wherein:
the generating of the reflectance inference model further comprises generating a look-up table comprising a plurality of reflectance values interpolated from the plurality of data points mapped to the coordinate system,
each reflectance value corresponding to a particular combination of range and raw intensity values.

10. The Lidar calibration system of claim 9, wherein the operations further comprise:
compressing the look-up table to generate a compressed look-up table; and
storing the compressed look-up table in a memory device of a vehicle computing system.

11. A method comprising:
collecting, by a Lidar calibration system comprising at least a first hardware processor, a data set comprising a plurality of data points output by a light detection and ranging (Lidar) unit of an autonomous vehicle, each of the data points corresponding to one of multiple targets, each target having a known reflectance value;
generating, by the Lidar calibration system, a reflectance inference model for the Lidar unit based on the data set, the generating of the reflectance inference model comprising mapping the plurality of data points to a coordinate system using range and raw intensity values of each data point as coordinates;
accessing, by a reflectance inference system of a vehicle computing system comprising at least a second hardware processor, an incoming data point output by the Lidar unit during operation of the autonomous vehicle;
determining, by the reflectance inference system and using the reflectance inference model, an inferred reflectance value of an object based on the incoming data point, the inferred reflectance value being interpolated from at least two data points mapped to the coordinate system; and
determining, by a motion planning system of the vehicle computing system, a motion plan for the autonomous vehicle based on the inferred reflectance value, the motion plan of the autonomous vehicle being used to control motion of the autonomous vehicle.

12. The method of claim 11, wherein the determining of the inferred reflectance value of the object comprises:
mapping the incoming data point to the coordinate system;
identifying two or more nearest neighbors of the incoming data point mapped to the coordinate system, the two or more nearest neighbors including the at least two data points; and
interpolating the inferred reflectance value from the two or more nearest neighbors.

13. The method of claim 11, wherein:
the generating of the reflectance inference model further comprises:
generating a look-up table comprising a plurality of reflectance values interpolated from the plurality of data points mapped to the coordinate system, each reflectance value corresponding to a particular combination of range and raw intensity values; and
the determining of the inferred reflectance value of the object comprises:
accessing, by the vehicle computing system, the look-up table from a memory device of the vehicle computing system; and
determining, by the vehicle computing system, the inferred reflectance value from the look-up table based on a range value and a raw intensity value of the incoming data point.

14. The method of claim 11, wherein:
the collecting of the data set includes collecting data points output by each channel of the Lidar unit; and
the generating of the reflectance inference model includes generating, for each channel, a mapping of data points to the coordinate system.

15. The method of claim 14,
each channel of the Lidar unit is capable of operating at a plurality of power levels;
the collecting of the data points output by each channel of the Lidar unit includes collecting data points output by each channel at each power level; and
the generating of the reflectance inference model includes generating multiple mappings of the data points to the coordinate system, each mapping corresponding to a particular power level of a particular channel.

16. The method of claim 15, wherein:
the determining of the inferred reflectance value of the object includes selecting a mapping from the multiple mappings based on a channel of the Lidar unit that output the incoming data point and a power level of the channel.

17. The method of claim 11, wherein the collecting of the data set comprises:
arranging a plurality of targets, each of the targets having a known reflectance; and
collecting at least one data point corresponding to each target.

18. The method of claim 17, wherein the operations further comprise:
mounting the Lidar unit on a gimbal; and
using the gimbal to position the Lidar unit at multiple angles; and
wherein the collecting of the at least one data point corresponding to each target includes collecting at least one data point corresponding to each target at each angle of the multiple angles.

* * * * *